United States Patent
Spencer et al.

(10) Patent No.: US 8,356,058 B2
(45) Date of Patent: Jan. 15, 2013

(54) RUNTIME DEPENDENCY ANALYSIS FOR CALCULATED PROPERTIES

(75) Inventors: Sam Spencer, Redmond, WA (US); John Rivard, Redmond, WA (US); Stephen Provine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/621,964

(22) Filed: Nov. 19, 2009

(65) Prior Publication Data
US 2011/0119681 A1    May 19, 2011

(51) Int. Cl.
G06F 7/00    (2006.01)
G06F 17/30    (2006.01)

(52) U.S. Cl. ........................................ 707/800
(58) Field of Classification Search ........................ None
See application file for complete search history.

(56) References Cited

U.S. PATENT DOCUMENTS

| | | | |
|---|---|---|---|
| 6,499,062 B1 | 12/2002 | Shteyn | |
| 6,986,123 B2 | 1/2006 | Finocchio | |
| 7,171,648 B1 | 1/2007 | Finocchio | |
| 2005/0172306 A1* | 8/2005 | Agarwal et al. | 719/328 |
| 2005/0262108 A1* | 11/2005 | Gupta | 707/100 |
| 2009/0006146 A1* | 1/2009 | Chowdhary et al. | 705/7 |

OTHER PUBLICATIONS

Xiaoming, et al., "Data Dependence Analysis in Presence of Inheritance and Polymorphism", retrieved at <<http://ieeexplore.ieee.org/stamp/stamp.jsp?arnumber=00846548>>, IEEE, May 17, 2000, pp. 220-228.

Chaffin, et al., "Managing Metadata in SQL Server 2005", retrieved at <<http://msdn.microsoft.com/en-us/library/cc966384.aspx>>, Microsoft Corporation, Mar. 15, 2006, pp. 22.
"WPF Performance Whitepaper", retrieved at <<http://blogs.msdn.com/kiranku/>>, Microsoft Corporation, Dec. 1, 2006, pp. 25.
"Dependency Properties or Attached Properties", retrieved at <<http://blogs.silverlight.net/blogs/jesseliberty/archive/2007/09/19/dependency-properties-or-attached-properties.aspx>>, Sep. 19, 2007, pp. 3.
"Managing Metadata Dependencies", retrieved at << http://download.oracle.com/docs/cd/B28359_01/owb.111/b312801/mdm_9.htm>>, Oracle, May 2008, pp. 8.
Grundy, et al., "Supporting Flexible Consistency Management via Discrete Change Description Propagation", retrieved at <<http://eprints.kfupm.edu.sa/67582/1/67582.pdf>>, Software—Practice and Experience vol. 20, No. 6, 1996, pp. 1-19.
"Property Change Events", retrieved at <<http://msdn.microsoft.com/en-us/library/bb613543.aspx>>, Microsoft Corporation, Sep. 14, 2009, pp. 2.

* cited by examiner

Primary Examiner — Uyen T. Le

(57) ABSTRACT

Techniques for determining and tracking dependent properties for a calculated property are provided. A request for a value of a first property is received. The value for the first property is calculated, including accessing values for one or more properties used to calculate the value for the first property. The accessing of the values for the one or more properties may be detected, and the one or more properties may be tracked as dependent properties for the first property in a first set of dependent properties. A change in the value of a second property may subsequently be detected. If the second property is determined to be included in the first set of dependent properties, the value of the first property is invalidated.

20 Claims, 10 Drawing Sheets

RUNTIME DEPENDENCY ANALYSIS FOR CALCULATED PROPERTIES

BACKGROUND

Development systems exist that are used by application developers to generate applications, including business applications, in response to any type of need. Such applications may utilize structured data. For instance, an object or resource may be defined for an application that describes a structure of data for instances of the resource, and describes methods for interacting with the data of the resource. The resource may include one or more properties (which may also be referred to as attributes, fields, data members, etc.), with each property having a corresponding name and a data value. Instances of the resource may be created that include data values for each property. For example, data values for properties of resource instances may be accessed from a database that stores data in the form of tables having rows and columns.

In some cases, developers may desire to define properties that are read only and that are calculated based on the values of other properties. For such calculated properties, calculation code may be defined that is used to calculate the value of the property. Furthermore, runtime code may be developed to calculate or recalculate values for the property at desired times using the calculation code.

Calculated values for a property may become invalid when the values of one or more of the properties upon which the value of the property depends ("dependent properties") change. To avoid invalid property values, various solutions have been developed for recalculating property values for a calculated property after values of the dependent properties have changed. In one example solution, a developer may provide a recalculated property value when a dependent property changes value. However, such a solution requires manual intervention by the developer. According to another solution, the developer may define which properties the calculation is dependent upon in a manner that may be used by the runtime code to know when to recalculate the property value. However, this solution also requires additional upfront effort by the developer. In still another solution, the calculation code may be analyzed at design time to generate a list of all dependent properties that may used by the runtime code to calculate the property value. However, such a solution is complex and may result in more properties being tracked than are actually used to calculate the property value.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for determining and tracking dependent properties for a calculated property are provided, as well as techniques for recalculating values for properties. When a value for a property is calculated during runtime, other properties used in the calculation are determined and tracked in a set of dependent properties. When a change in a value of one or more of these tracked properties occurs, the change is detected, and the previously calculated value of the property is invalidated. A recalculation of the value of the property may subsequently be performed if desired and/or needed. During the recalculation, a new set of dependent properties is generated that includes properties used during the recalculation. In this manner, dependent properties may be determined and tracked at runtime, in an automatic manner, enabling calculated properties to be recalculated when their dependent properties change.

For instance, in a first implementation, a method is provided. A request for a value of a first property is received. The value for the first property is calculated. During the calculation, values for one or more properties used to calculate the value for the first property are accessed. The accessing of the properties is detected, and the one or more properties are tracked as dependent properties for the first property in a first set of dependent properties. A change in the value of a second property may subsequently be detected. If the second property is determined to be included in the first set of dependent properties, the value of the first property is invalidated. A second request for a value for the first property may be received. The first set of dependent properties is cleared, and a new value for the first property may be calculated, resulting in a second set of dependent properties being generated for the first property.

In another implementation, a system is provided. The system includes property value monitoring logic and a dependency manager. Before calculation logic for a calculated first property is performed, the calculation logic notifies the property value monitoring logic to track subsequent property accesses as dependents properties of the calculated property. The calculation logic is performed and the particular properties that are used to calculate the value of the first property are tracked, and indicated as dependent properties for the first property. The dependency manager tracks the dependent properties for the first property, and may track dependent properties for other calculated properties.

If a value of the first property is subsequently requested, and the property value monitoring logic has not been notified that any of its dependent properties have changed, the calculated value of the first property can be returned, and does not need to be recalculated.

The property value monitoring logic is further configured to receive a change notification generated based on the detection of a change in the value of a second property. The dependency manager is configured to receive the request and to generate an indication of which properties have the second property as a dependent property. The dependency manager may determine whether the second property is included in any of a plurality of sets of dependent properties. An indication that a corresponding calculated property is invalid may be generated for each of the sets of dependent properties determined to include the second property. For example, if the second property is determined to be a dependent property for the first property, the first property is indicated as invalidated.

After the first property is invalidated in this manner, on subsequent requests for the value of the first property, the value of the first property is recalculated, and the dependent properties are recalculated. The property value monitoring logic is configured to generate a clear instruction. The dependency manager receives the clear instruction, and is configured to clear any previously tracked dependent properties for the first property. The property value monitoring logic receives any property access notifications during recalculation of the value of the first property, and the dependency manager stores the accessed properties as a new set of dependent properties. The calculation logic for the first property can contain conditional logic that depends on the value of accessed properties, and as such, sets of dependent properties having different members may be generated during each time the first property is recalculated.

Computer systems and computer program products (stored on a computer readable medium) are also described herein for determining and tracking dependent properties, for recalculating property values when dependent properties change during runtime, and for implementing further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
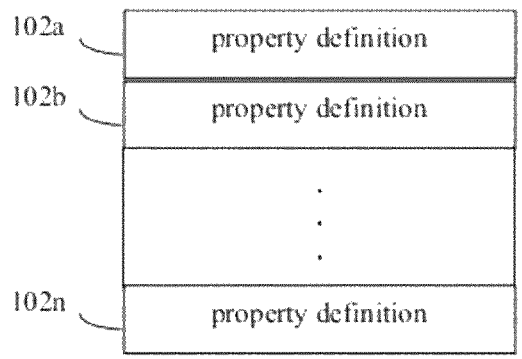
FIG. 1 shows a block diagram of a resource.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments

Embodiments are described herein for determining properties on which a particular property value depends ("dependent properties"), and for recalculating property values when dependent properties change during runtime. Embodiments enable developers to provide calculation logic for a property without having to be concerned about when calculations of the value of the property are performed. Instead, runtime logic is provided that manages the recalculation of property values. Such embodiments enable "on-the-fly" runtime analysis of property dependencies. When a property value is calculated during runtime, other properties used in the calculation are determined and tracked. In this manner, when changes in the values of these other properties occur, a recalculation of the property value may be triggered.

In embodiments, a dependent property may be determined and tracked by intercepting accessors of the property to determine when a particular calculation is performed that uses the property and to determine change events on this property. Such tracking of the dependent property at runtime enables automatic recalculation of property values that are calculated based on the dependent property.

Embodiments are applicable to any type or form of data, including data configured according to object-oriented programming constructs such as objects, classes, entities, etc. Such data constructs may include one or more properties, and may include logic/code that defines how to interface/interact with the data construct. Instances of such data constructs include data values for the properties. Data values for such data constructs may be accessed in rows and columns of tables stored in databases, in a spreadsheet that has some cells filled with data values and other cells that are calculated based on a formula, etc.

Figure 2:
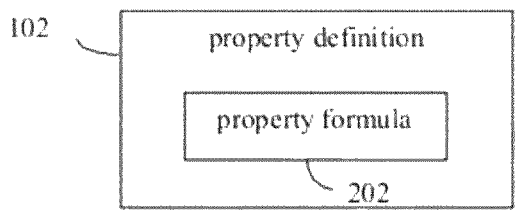
FIG. 2 shows a block diagram of a property definition that includes a property formula.

FIG. 1 shows a block diagram of an example resource 100. Resource 100 may be a data construct such as an object, a class, an entity, etc. As shown in FIG. 1, resource 100 includes a plurality of property definitions 102a-102n. Resource 100 may include any number of property definitions 102, which correspond to properties of resource 100. Property definitions 102a-102n may each include any type of property definition for determining a data value for the corresponding property when an instance of resource 100 is generated. For instance, property definitions 102a-102n may each define a property as a data value read from a row of a table, as a calculated data value, etc. For example, FIG. 2 shows a block diagram of a property definition 102 that includes a property formula 202. Property formula 202 includes code/logic (e.g., "calculation code") for determining a data value for the property corresponding to property definition 102, when an instance of a resource that includes the property is generated. Property formula 202 may use values of one or more other properties (dependent properties) to calculate the value of the property.

Figure 3:
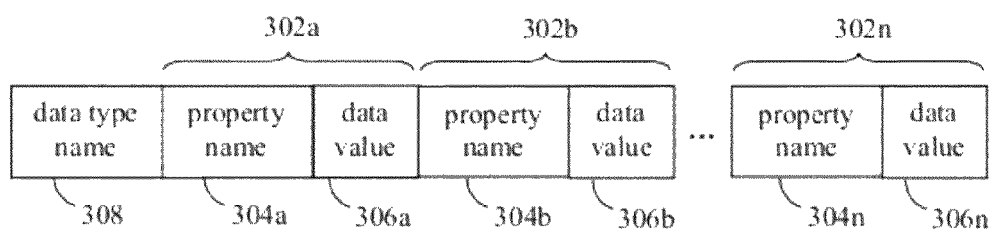
FIG. 3 shows a block diagram of a resource instance, which is an example of an instance of the resource shown in FIG. 1.

FIG. 3 shows a block diagram of a resource instance 300, which is an example of an instance of resource 100 shown in FIG. 1. Resource instance 300 has a resource name 308, such as "Employee" (e.g., when resource 100 is used to represent employee data) or other name, which may be descriptive of a structure of the included data. As shown in FIG. 3, resource instance 300 has a structure defined by a set of properties 302a-302n corresponding to property definitions 102a-102n. Resource instance 300 may include one or more properties 302. As shown in FIG. 3, properties 302a-302n are each expressed as a name/value pair, each name/value pair including a corresponding property name 304 and a data value 306. Data value 306 may include a value and an associated type (e.g., integer, string, date, etc.)). For example, property 302a includes a property name 304a and a data value 306a, and property 302b includes a property name 304b and a data value 306b. Each property name 304 has a value that is a name for the corresponding property 302, and the corresponding data value 306 is a data value for the property 302 in resource instance 300.

For instance, in an example where resource name 308 for resource instance 300 is "employee," property name 304a may be "name," and data value 306a may be "Tom Smith," property name 304b may be "birth date," and data value 306b may be "1976-08-27," and a property name 304c may be "age," and data value 306c may be "33." Note that in the current example, data values 306a and 306b ("name" and "birth date") may be read from a row of a table of database, from spreadsheet cells, etc. Furthermore, data value 306c ("age") may be a calculated data value, calculated based upon the "birth date" data value 306b of property 302b. Thus, property definition 102c corresponding to property 302c may include a property formula configured to calculate data value 306c of property 302c based on data value 306b of property 302b.

Figure 4:
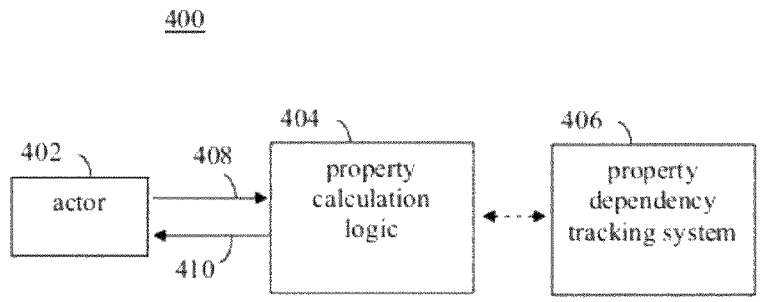
FIG. 4 shows a block diagram of a dependent property determining and tracking system, according to an example embodiment.

As described above, in embodiments, dependent properties on which a particular property value depends are determined, and property values are enabled to be recalculated when the dependent properties change during runtime. For instance, FIG. 4 shows a block diagram of a dependent property determining and tracking system 400, according to an example embodiment. System 400 is configured to determine dependent properties, and to enable property values to be recalculated when dependent properties change. As shown in FIG. 4, system 400 includes an actor 402, property calculation logic 404, and a property dependency tracking system 406. System 400 is described as follows.

Actor 402 may be a person (e.g., a developer) or logic (e.g., hardware logic, computer code of a computer program, etc.) that generates a property value request 408, which is a request for a value of a property. Property calculation logic 404 is configured to calculate the value for the property, according to property value request 408. For example, property calculation logic 404 may include logic, such as hardware logic, computer code of a computer program, etc. For instance, property calculation logic 404 may include an instance of a resource, such as resource 100 shown in FIG. 1. The resource may include a property definition, such as property definition 102 shown in FIG. 2, which includes a property formula 202 that includes logic/code for calculating the value of the property (e.g., "calculation code"). In such an embodiment, property calculation logic 404 may include a resource in the form of a programming code, such as ActionScript, C++, C#, Common Lisp, ECMAScript, Java, Objective-C, PHP, Python, Ruby, Smalltalk, Visual Basic .NET, or other suitable code format. As shown in FIG. 4, property calculation logic 404 generates property value 410, which may be received by actor 402. Property dependency tracking system 406 is configured to determine and to track dependent properties used for calculation of the value of the property during runtime (e.g., "runtime code"). By tracking such dependent properties, property dependency tracking system 406 can determine when values of the dependent properties change, such that the value of the property should be recalculated.

For instance, in an embodiment, when an instance of a resource that includes a calculated property is initially generated, a first calculation may be performed by property calculation logic 404 to determine the initial value of the property. At the time of this first calculation, a set of properties on which the calculation depends may be generated and maintained by property dependency tracking system 406. For instance, property dependency tracking system 406 may track all property accessors that take place until the calculation is complete to generate the set of dependent properties. Subsequent to the first calculation, property dependency tracking system 406 may monitor data value change notifications for the dependent properties, and may flag the calculated property for recalculation when any of the dependent properties change value. The set of dependent properties for the calculated property may be regenerated based on the calculations actually performed during the recalculation, and the branches of calculation code leading to the particular recalculated value. Each time a value is recalculated for a property, the members of the set of dependent properties for the property may change, depending on which properties are used during the recalculation. In this way, calculated properties are consistently updated by property dependency tracking system 406 within the context of runtime execution.

Figure 5:
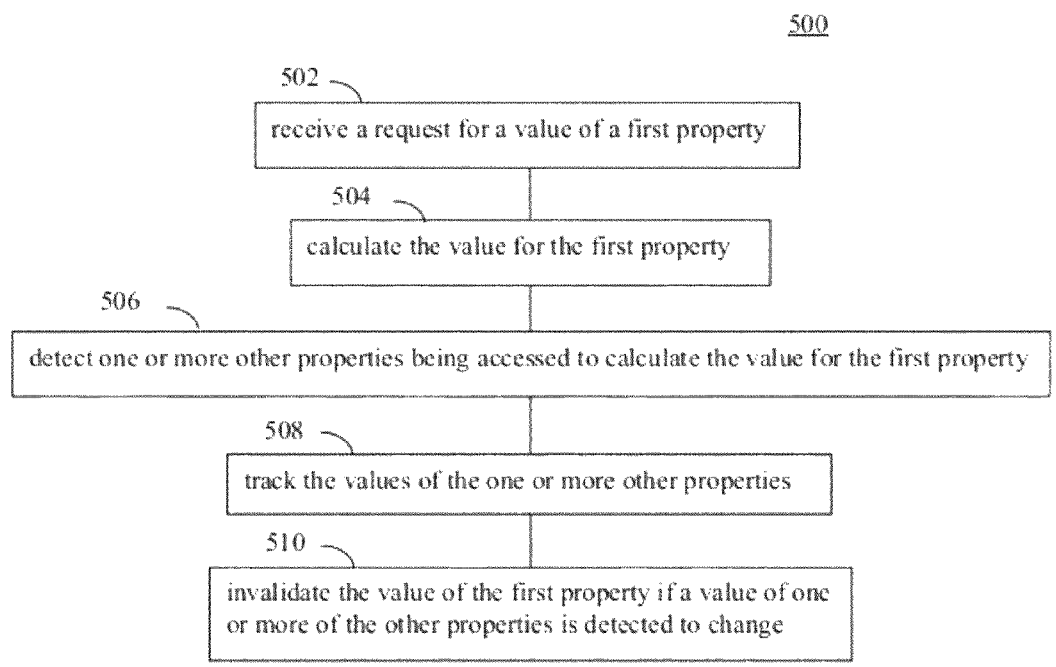
FIG. 5 shows a flowchart providing a process for determining a value of a property, according to an example embodiment.
Figure 6:
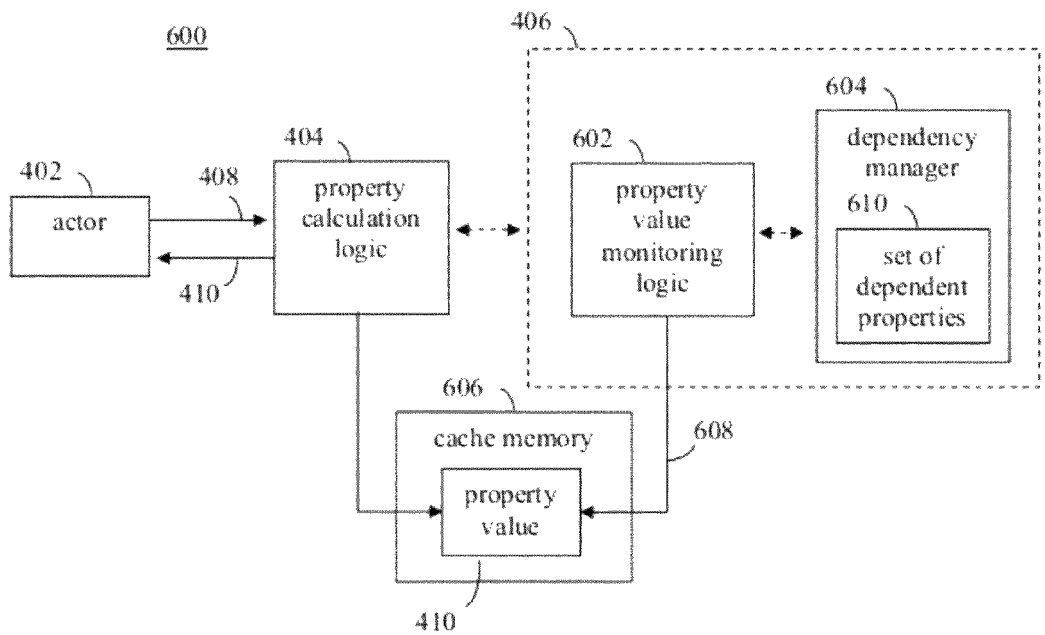
FIG. 6 shows a block diagram of a dependent property determining and tracking system, according to an example embodiment.

FIG. 5 shows a flowchart 500 providing a process for determining a value of a property, according to an example embodiment. For instance, system 400 shown in FIG. 4 may operate according to flowchart 500. For illustrative purposes, flowchart 500 is described with reference to FIG. 6. FIG. 6 shows a block diagram of a dependent property determining and tracking system 600, according to an example embodiment. System 600 is similar to system 400 shown in FIG. 4, with the addition of a cache memory 606. Furthermore, in FIG. 6, property dependency tracking system 406 includes property value monitoring logic 602 and a dependent manager 604. Further structural and operational embodiments will be apparent to persons skilled in the relevant art(s) based on the discussion regarding flowchart 500. Flowchart 500 and system 600 are described as follows.

Flowchart 500 begins with step 502. In step 502, a request for a value of a first property is received. For example, as shown in FIG. 6, property calculation logic 404 receives property value request 408, which includes a request for a value of a first property.

In step 504, the value for the first property is calculated. In FIG. 6, property calculation logic 404 is configured to calculate the value for the first property. For example, property calculation logic 404 may include calculation code configured to calculate a data value for the first property. As shown in FIG. 6, property calculation logic 404 generates property value 410, which is stored in cache memory 606 (and may optionally be received by actor 402). Cache memory 606 may be any suitable storage mechanism, including runtime memory (e.g., one or more memory devices, such as RAM devices, etc.).

Figure 7:
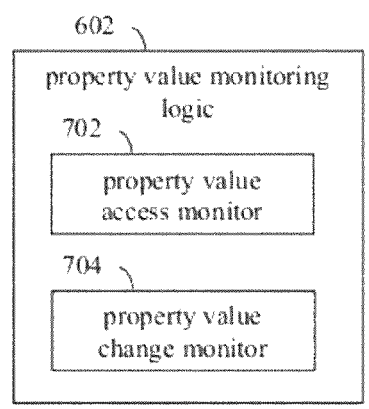
FIG. 7 shows a block diagram of property value monitoring logic, according to an example embodiment.

In step 506, one or more other properties being accessed to calculate the value for the first property are detected. In an embodiment, property value monitoring logic 602 may monitor accesses to properties used to calculate values for the first property. For example, FIG. 7 shows a block diagram of property value monitoring logic 602, according to an embodiment. As shown in FIG. 7, property value monitoring logic 602 includes a property value access monitor 702. Property value access monitor 702 is configured to monitor accesses to properties during calculations for property value monitoring logic 602. Property value access monitor 702 may monitor accesses to properties during the calculation in any manner, including by monitoring or intercepting accesses to property values in memory and/or storage, by receiving access notifications generated by property calculation logic 404 when accessing property values (as described further below), etc. Any number of properties may be included in the calculation, and may be detected by property value access monitor 702.

In step 508, the values of the one or more other properties are tracked. In an embodiment, dependency manager 604 may be configured to generate and maintain a set of dependent properties 610 detected for the first property in step 506. When property value monitoring logic 602 detects that a property is being accessed to generate a value for the first property, property value monitoring logic 602 may indicate the detected property as a dependent property for the first property, and may instruct dependency manager 604 to add the detected property to set of dependent properties 610 for the first property. Any number of properties detected by property value monitoring logic 602 used in the calculation (in step 506) may be tracked by being added to set of dependent properties 610 or in any other suitable manner.

In step 510, the value of the first property is invalidated if a value of one or more of the other properties is detected to change. In an embodiment, property value monitoring logic 602 may monitor changes to values of the properties used to calculate the first property. As shown in FIG. 7, property value monitoring logic 602 includes a property value change monitor 704. Property value change monitor 704 is configured to monitor changes to property values for property value monitoring logic 602. Property value change monitor 704 may monitor changes to values of properties in any manner, including by monitoring or intercepting changes made to property values in memory and/or storage, by receiving change notifications generated by property calculation logic 404 when receiving changed property values (as further described below), etc. When property value change monitor 704 detects that a value of a property is changed, property value monitoring logic 602 may request that dependency manager 604 indicate whether the detected changed property is included in set of dependent properties 610. If dependency manager 604 indicates that the detected changed property is included in set of dependent properties 610, dependency manager 604 and/or property value monitoring logic 602 may determine that the value of the first property is invalid. In such case, in an embodiment, dependency manager 604 and/or property value monitoring logic 602 may optionally clear property value 410 in cache memory 606. For instance, as shown in FIG. 6, property value monitoring logic 602 may generate a clear command 608. In any event, a value for the first property should be recalculated prior to a next time that a value of the first property is desired (e.g., by actor 402 or other entity).

Flowchart 500 may be performed in various ways, in embodiments. For instance, example embodiment for determining dependent properties, for monitoring dependent properties, and for recalculating property values when dependent properties change, are provided in the following subsections.

A. Example Embodiment for Determining Dependent Properties

Figure 8:
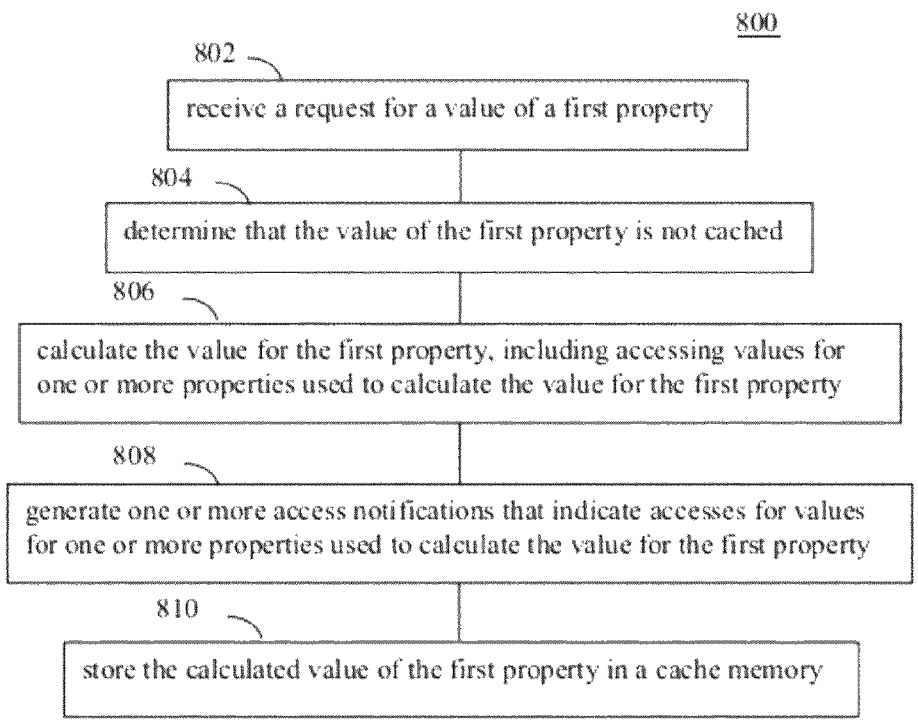
FIGS. 8-10 show flowcharts providing processes that may be performed to calculate a value for a property and to generate a set of dependent properties for the calculated property, according to example embodiments.
Figure 9:
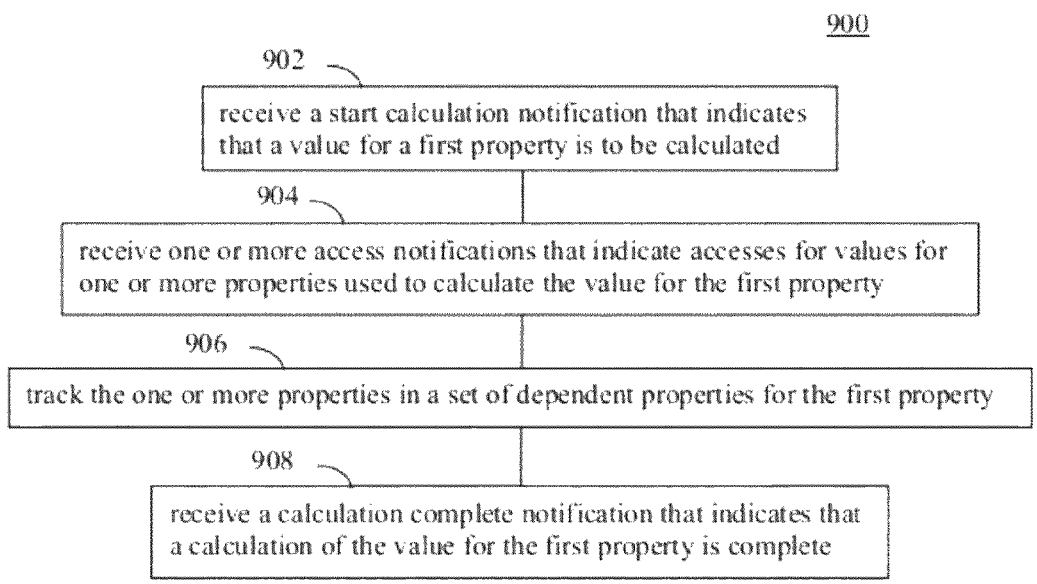
Figure 10:
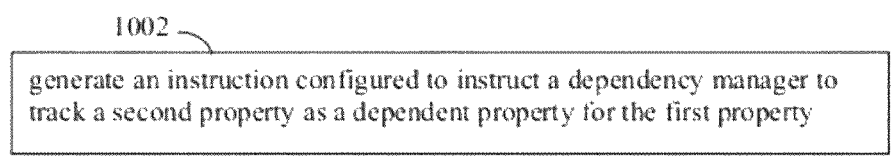

This subsection describes example embodiments for determining dependent properties. For example, FIGS. 8-10 show flowcharts providing processes that may be performed to generate a set of dependent properties for a calculated property, according to example embodiments. In particular, FIG. 8 shows a flowchart 800 providing a process that may be performed by property calculation logic 404 of FIG. 6, according to an example embodiment. FIG. 9 shows a flowchart 900 and FIG. 10 shows a step 1002 that may be performed by property value monitoring logic 602, according to an example embodiment. For illustrative purposes, flowchart 800, flowchart 900, and step 1002 are described with reference to FIG. 11, which shows a sequence diagram 1100 for interactions between actor 402, property calculation logic 404, a property value source 1102, property value monitoring logic 602, and dependency manager 604, according to an example embodiment. Further structural and operational embodiments will be apparent to persons skilled in the relevant art(s) based on the discussion regarding flowchart 800, flowchart 900, and step 1002. Flowcharts 800 and 900, step 1002, and sequence diagram 1100 are described as follows.

Figure 11:
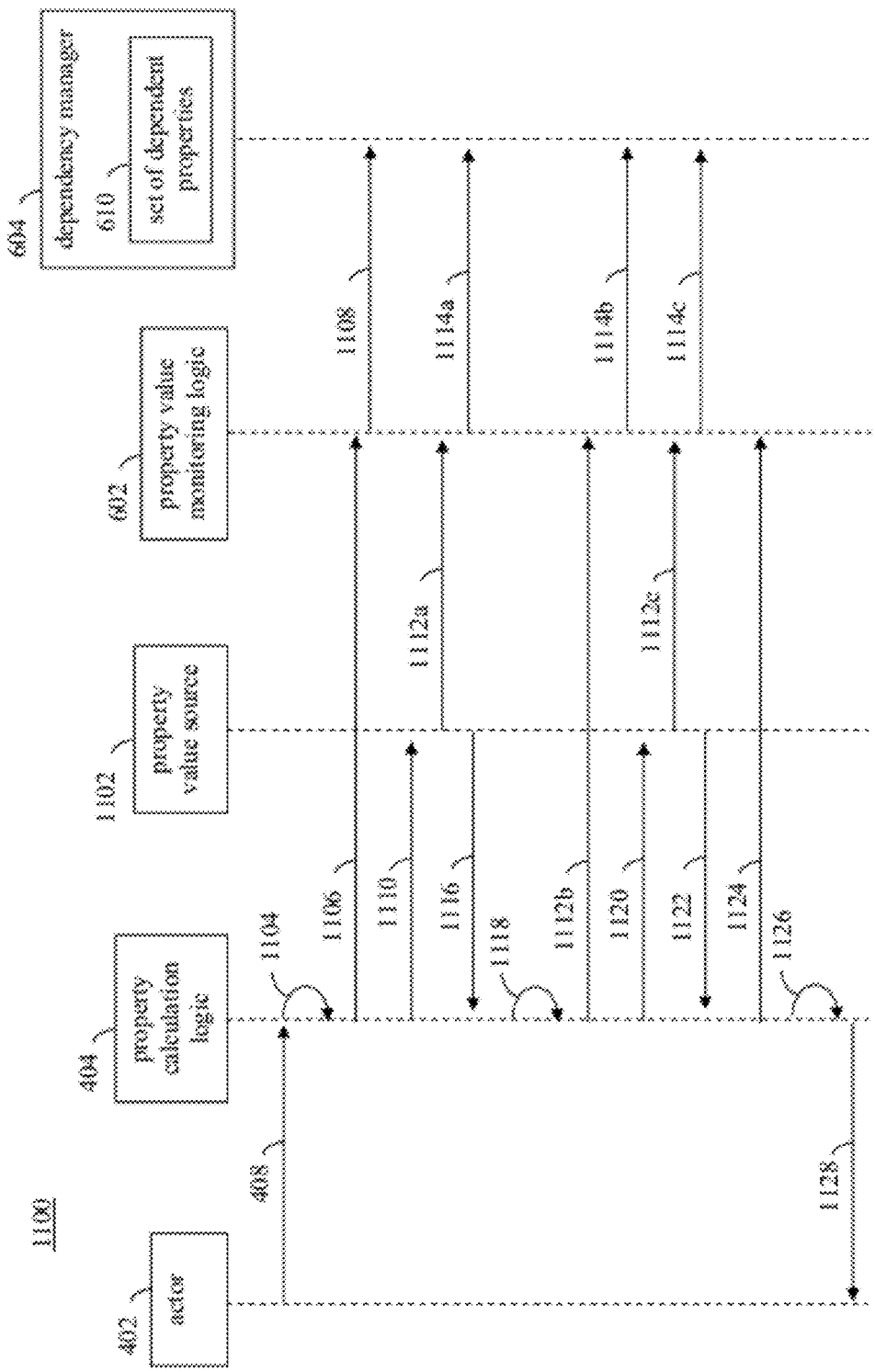
FIG. 11 shows a sequence diagram for interactions related to calculating a value for a property and generating an associated set of dependent properties, according to an example embodiment.

Referring to FIG. 8, flowchart 800 begins with step 802. In step 802, a request for a value of a first property is received. For example, as shown in FIG. 11, property calculation logic 404 receives property value request 408 from actor 402, which includes a request for a value of a first property.

In step 804, the value of the first property is determined to not be cached. For instance, as shown in FIG. 11, property calculation logic 404 may access cache memory (e.g., cache memory 606 in FIG. 6) for a value for the first property, as indicated by cache access 1102. If property calculation logic 404 determines that a value for the first property is not cached, operation proceeds to step 806.

In step 806, the value for the first property is calculated, including accessing values for one or more properties used to calculate the value for the first property. Because the first property (of property value request 408) is a calculated property, property calculation logic 404 is configured to calculate the value for the first property. For example, property calculation logic 404 may include calculation code configured to calculate a data value for the first property. As shown in FIG. 11, property calculation logic 404 may generate a start calculation notification 1106, which is received by property value monitoring logic 602. Start calculation notification 1106 indicates to property value monitoring logic 602 that a value for the "Calc1" property is being calculated. Accordingly, property value monitoring logic 602 may generate a clear dependencies notification 1108, which is received by dependency manager 604. In response, dependency manager 604 may clear dependencies, if any, included in set of dependent properties 610 for the "Calc1" property, so that no dependent properties are indicated.

For instance, in one example, property calculation logic 404 may include a class-type resource that includes the first property. An example class resource ("Class 1") included by property calculation logic 404 may be modeled as follows:

Class 1

+*A*

+*B*

+*Calc*1

+*MyClass*2

According to this example model, the Class 1 resource includes a first property "A", a second property "B", and a third property "Calc1". First and second properties "A" and "B" are provided with data values on an instance by instance basis, and the third property is a calculated property, which is calculated on an instance by instance basis. In the current example, the "Calc1" property may have the following implementation (e.g., calculation code or property formula 202):

```
if MyClass2.C >= 100 then
    return B + MyClass2.C
else
    return A + MyClass2.D
```

As such, the value of the "Calc1" property of the Class 1 resource is dependent on the values of the "A" and "B" properties of the Class 1 resource, and is also dependent on the values of "C" and "D" properties of a second class-type resource, referenced by the Class 1 resource as "MyClass2". The second class-type resource ("Class 2") may be modeled as follows:

Class 2

+*C*

+*D*

According to this example model, the Class 2 resource includes a fourth property "C" and a fifth property "D." Fourth and fifth properties "C" and "D" are provided with data values on an instance by instance basis.

In the current example, property value request 408 of step 802 is a request for a value of the "Calc1" property. To calculate a value of the "Calc1" property, property calculation logic 404 evaluates whether MyClass2.0>=100. To perform the evaluation, property calculation logic 404 accesses a value for the "C" property by generating a first property value access request 1110, which is received by property value source 1102. Property value source 1102 maintains values for one or more properties, and may be implemented in the form of storage and/or logic, such as hardware logic, computer code, etc. For instance, in an embodiment, property value source 1102 may include an instance of a resource, similarly to property calculation logic 404. In the current example, property value source 1102 may include the Class 2 resource, and thus may maintain values for the "C" and "D" properties of the Class 2 resource. As such, property calculation logic 404 accesses the value of the "C" property from property value source 1102 using first property value access request 1110. In embodiments, any number of one or more property value sources may be present that may be accessed for property values.

In step 808, one or more access notifications are generated that indicate accesses for values for one or more properties used to calculate the value for the first property. For instance, as shown in FIG. 11, upon receiving property value access request 1110, property value source 1102 may generate a first access notification 1112a, which is received by property value monitoring logic 602. In the current example, first access notification 1112a indicates that a value for the "C" property was accessed at property value source 1102. As shown in FIG. 11, property value source 1102 also generates a returned property value 1116, which is received by property calculation logic 404. Returned property value 1116 includes a value for the "C" property, which may be used by property calculation logic 404 to evaluate whether MyClass2.0>=100 (in step 806).

For purposes of illustration, initial property values for the current example maintained by property calculation logic 404 (the "A" and "B" properties) and property value source 1102 (the "C" and "D" properties) are shown as follows:

Data value for "A" property=5
Data value for "B" property=10
Data value for "C" property=15
Data value for "D" property=20

Thus, in the current example, returned property value 1116 includes "15" as the value for the "C" property requested in property value access request 1110.

Referring to FIG. 9, flowchart 900 begins with step 902. In step 902, a start calculation notification is received that indicates that a value for a first property is to be calculated. For instance, as described above, in FIG. 11, property calculation logic 404 may generate a start calculation notification 1106 that is received by property value monitoring logic 602. Start calculation notification 1106 indicates to property value monitoring logic 602 that a value for the "Calc1" property is being calculated.

In step 904, one or more access notifications are received that indicate accesses for values for one or more properties used to calculate the value for the first property. For example, as described above, property value monitoring logic 602 (e.g., property value access monitor 702 of FIG. 7) receives first access notification 1112a. First access notification 1112a indicates that a value for the "C" property was accessed to calculate a value for the "Calc1" property.

In step 906, the one or more properties are tracked in a set of dependent properties for the first property. In an embodiment, dependency manager 604 may track the "C" property as a dependent property for the "Calc1" property. For instance, referring to FIG. 10, in step 1002, an instruction is generated that is configured to instruct a dependency manager to track a second property as a dependent property for the first property. Referring to FIG. 11, subsequent to receiving first access notification 1112a, property value monitoring logic 602 may generate a first track dependency instruction 1114a, which is received by dependency manager 604. First track dependency instruction 1114a is configured to instruct dependency manager 604 to track the "C" property as a dependent property for the "Calc1" property. As such, dependency manager 604 may store an indication of the "C" property in set of dependent properties 610 for the "Calc1" property.

Note that step 808 of flowchart 800, steps 904 and 906 of flowchart 900, and step 1002 may be performed with regard to any number of properties accessed during step 806 of flowchart 800 to calculate a value for the first property.

For instance, in the current example, property calculation logic 404 may evaluate MyClass2.0>=100, for a value of MyClass2.0=15 (the initial value of the "C" property, received from property value source 1102). In such case, because 15 is not greater than or equal to 100, "return A+MyClass2.D" is calculated by property calculation logic 404 to determine a value for the "Calc1" property. To perform this calculation, property calculation logic 404 accesses values for the "A" and "D" properties.

In the current example, with regard to the "A" property, property calculation logic 404 includes the Class 1 resource, which maintains a value for the "A" property. As such, according to step 806 (FIG. 8), property calculation logic 404 may access the "A" property internally, as indicated by a second property value access request 1118. Subsequently, according to step 808, property calculation logic 404 may generate a second access notification 1112b, which indicates that a value for the "A" property was accessed (having the value of "5" in the current example). According to step 902 (FIG. 9), property value monitoring logic 602 receives second access notification 1112b. According to step 904, dependency manager 604 may track the "A" property as a dependent property for the "Calc1" property. For instance, according to step 1002 (FIG. 10), property value monitoring logic 602 may generate a second track dependency instruction 1114b, which is received by dependency manager 604. Second track dependency instruction 1114b is configured to instruct dependency manager 604 to track the "A" property as a dependent property for the "Calc1" property.

With regard to the "D" property, property value source 1102 includes the Class 2 resource, which maintains a value for the "D" property. As such, according to step 806 (FIG. 8), property calculation logic 404 generate a third property value access request 1120 to access a value of the "D" property from property value source 1102. Property value source 1102 receives third property value access request 1120, and generates a returned property value 1122, which is received by property calculation logic 404. Returned property value 1122 includes a value for the "D" property. According to step 808, property value source 1102 generates a third access notification 1112c, which indicates that a value for the "D" property was accessed (having the value of "20" in the current example). According to step 902 (FIG. 9), property value monitoring logic 602 receives third access notification 1112c. According to step 904, dependency manager 604 may track the "D" property as a dependent property for the "Calc1" property. For instance, according to step 1002 (FIG. 10), property value monitoring logic 602 may generate a third track dependency instruction 1114c, which is received by dependency manager 604. Third track dependency instruction 1114c is configured to instruct dependency manager 604 to track the "D" property as a dependent property for the "Calc1" property.

At this point, property calculation logic 404 has received values for the "A" and "D" properties, and can therefore complete calculation of the "Calc1" property (according to step 806 of FIG. 8). Property calculation logic 404 calculates "return A+MyClass2.D", with values of "5" and "20" for the "A" and "MyClass2.D" parameters, respectively, to generate a value of "25" for the "Calc1" property.

Referring to FIG. 9, in step 908, a calculation complete notification is received that indicates that a calculation of the value for the first property is complete. As shown in FIG. 11, property calculation logic 404 may generate a calculation complete notification 1124, to indicate that the calculation of a value for the "Calc1" property is complete. Calculation complete notification 1124 is received by property value monitoring logic 602. Calculation complete notification 1124 indicates to property value monitoring logic 602 that no further access notifications for the current calculation of the value for the "Calc1" property will be received, and thus set of dependent properties 610 maintained by dependency manager 604 for the "Calc1" property is complete. In the current example, set of dependent properties 610 indicates the "C", "A", and "D" properties as dependent properties for the "Calc1" property. It is noted that as indicated by the above shown implementation of the "Calc1" property, in some conditions, the "B" property may be a dependent property for the "Calc1" property. However, because the "B" property was not used in the current calculation, it is not included as a dependent property for the "Calc1" property in set of dependent properties 610.

Referring back to flowchart 800 of FIG. 8, in step 810, the calculated value of the first property is stored in a cache memory. As just described, property calculation logic 404 calculates a value for the first property (in the current example, the property value is "25"), which may be stored in a cache memory according to a cache store request 1126. Furthermore, the calculated value may optionally be received by actor 402 as returned value 1128.

In embodiments, as described in the following subsection, the dependent properties included in set of dependent properties 610 may be monitored for changes, to determine whether the calculated first property (e.g., the "Calc1" property, in the current example) has become invalidated.

B. Example Embodiment for Monitoring Dependent Properties

Figure 12:
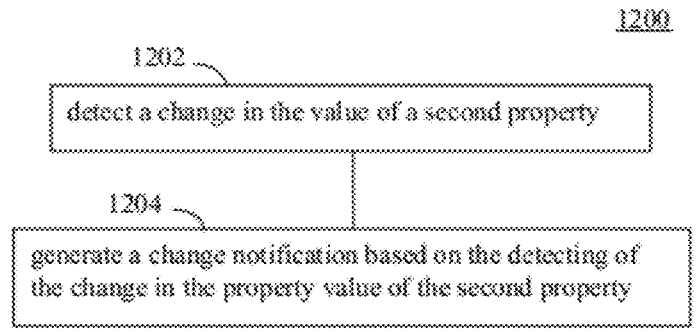
FIGS. 12-14 show flowcharts providing processes that may be performed to monitor changes to dependent properties of a calculated property, according to example embodiments.
Figure 13:
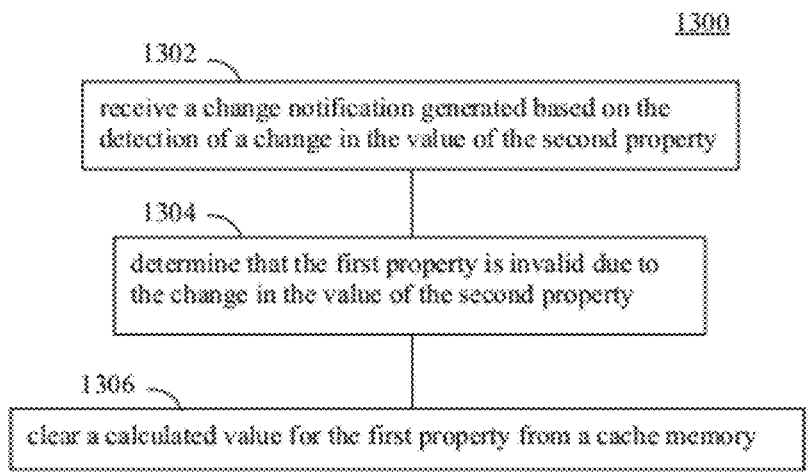
Figure 14:
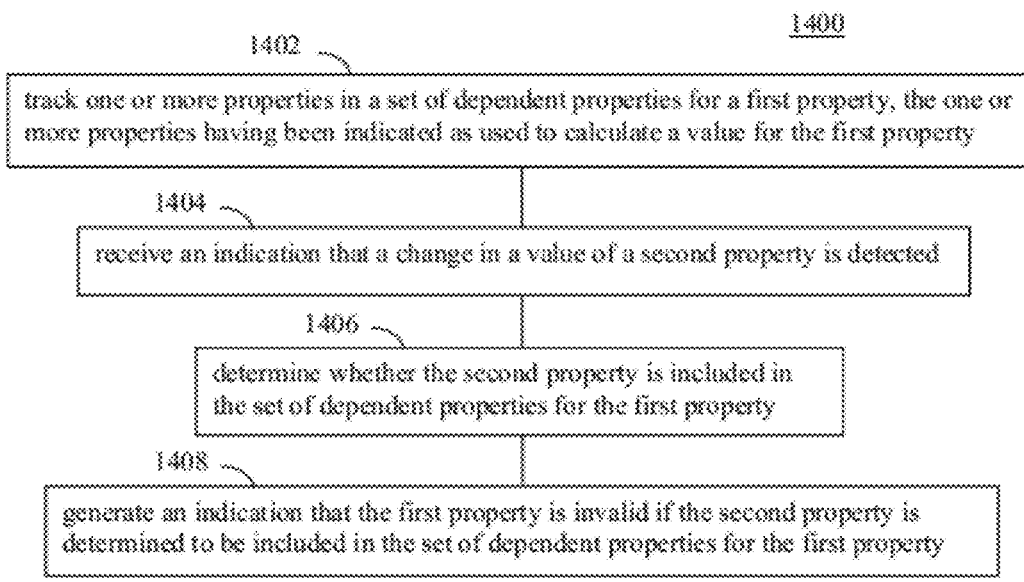

This subsection describes example embodiments for monitoring dependent properties. For example, FIGS. 12-14 show flowcharts providing processes that may be performed to monitor changes to dependent properties of a calculated property, according to example embodiments. In particular, FIG. 12 shows a flowchart 1200 providing a process that may be performed by property value source 1102 and/or property calculation logic 404, according to an example embodiment. FIG. 13 shows a flowchart 1300 providing a process that may be performed by property value monitoring logic 602, according to an example embodiment. FIG. 14 shows a flowchart 1400 that may be performed by dependency manager 604, according to an example embodiment. For illustrative purposes, flowcharts 1200, 1300, and 1400 are described with reference to FIG. 15, which shows a sequence diagram 1500 for interactions between actor 402, property calculation logic 404, property value source 1102, property value monitoring logic 602, and dependency manager 604, according to an example embodiment. Further structural and operational embodiments will be apparent to persons skilled in the relevant art(s) based on the discussion regarding flowcharts 1200, 1300, and 1400. Flowcharts 1200, 1300, and 1400, and sequence diagram 1500 are described as follows.

Figure 15:
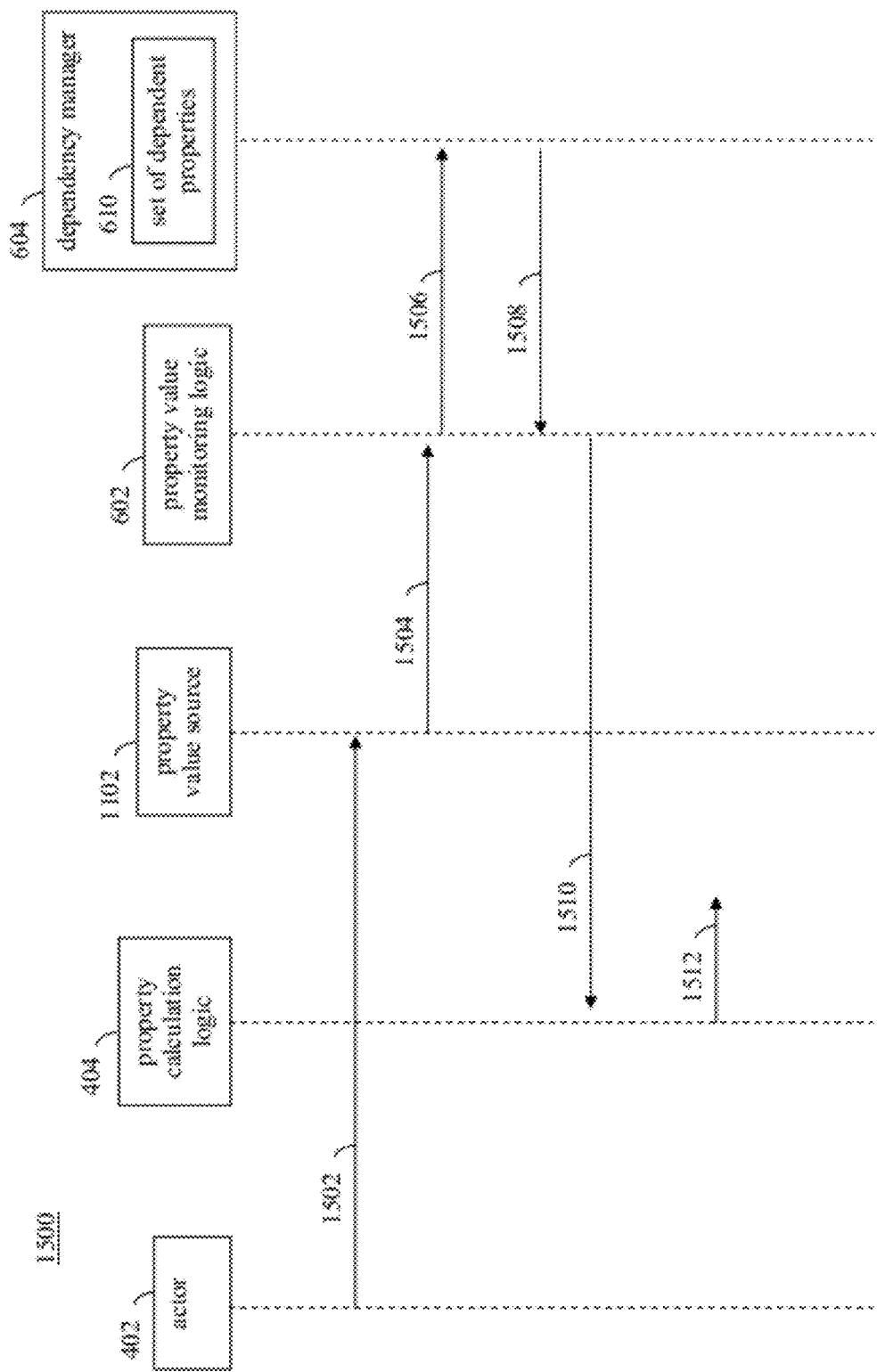
FIG. 15 shows a sequence diagram for interactions related to the monitoring of changes to dependent properties of a calculated property, according to an example embodiment.

Referring to FIG. 12, flowchart 1200 begins with step 1202. In step 1202, a change in the value of a second property is detected. For example, as shown in FIG. 15, property value source 1102 receives a property value change 1502 from actor 402, which includes a change in the value of a second property. For instance, continuing the example of the prior subsection, property value change 1502 may indicate that a value of the "C" property has been changed to "100" (from "15"). Note that property value change 1502 may be received from actor 402, as shown in FIG. 15, or from other actor/source (e.g., a database, etc.).

In step 1204, a change notification is generated based on the detecting of the change in the property value of the second property. For instance, as shown in FIG. 15, upon receiving property value change 1502, property value source 1102 may generate a change notification 1504, which is received by property value monitoring logic 602. Change notification 1504 indicates that the value of the "C" property was changed.

Referring to FIG. 13, flowchart 1300 begins with step 1302. In step 1302, a change notification is received that is generated based on the detection of a change in the value of the second property. For example, as described above, property value monitoring logic 602 (e.g., property value change monitor 704 of FIG. 7) receives change notification 1504. Change notification 1504 indicates that the value of the "C" property has changed.

In step 1304, the first property is determined to be invalid due to the change in the value of the second property. Subsequent to receiving change notification 1504, property value monitoring logic 602 may determine whether the second property indicated to have changed is a dependent property of the first property. To make this determination, property value monitoring logic 602 may interact with dependency manager 604.

Figure 16:
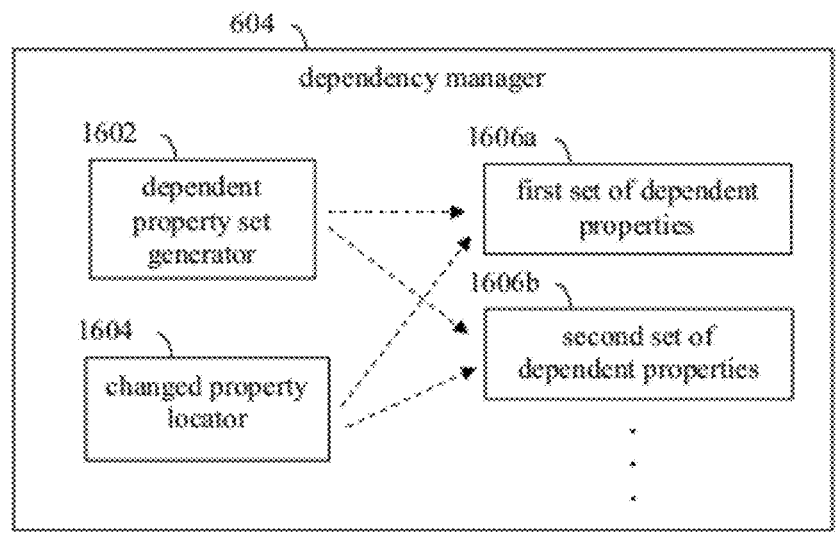
FIG. 16 shows a block diagram of a dependency manager, according to an example embodiment.

For instance, in an embodiment, dependency manager 604 may perform flowchart 1400 of FIG. 14. As shown in FIG. 14, flowchart 1400 begins with step 1402. In step 1402, one or more properties are tracked in a set of dependent properties for a first property, the one or more properties having been indicated as used to calculate a value for the first property. As described above with respect to FIGS. 8-11, dependency manager 604 may generate a set of dependent properties 610 that includes properties that were used to calculate the first property. For instance, FIG. 16 shows a block diagram of dependency manager 604, according to an example embodiment. As shown in FIG. 16, dependency manager 604 includes a dependent property set generator 1602 and a changed property locator 1604. Dependent property set generator 1602 is configured to receive tracking instructions (e.g., track dependency instructions 1114 in FIG. 11) from property value monitoring logic 602, which indicate dependent properties to be tracked for calculated properties. As shown in FIG. 16, dependent property set generator 1602 generates sets of dependent properties 1606a, 1606b, etc., based on the received tracking instructions. Each set of dependent properties 1606 indicates one or more dependent properties for a corresponding calculated property. Any number of sets of dependent properties 1606 may be generated by dependent property set generator 1602.

In step 1404, an indication is received that a change in a value of a second property is detected. For example, as shown in FIG. 15, property value monitoring logic 602 may generate a dependency request 1506, which is received by dependency manager 604. Dependency request 1506 indicates the second property, which changed value, and is a request for dependency manager 604 to determine whether the second property is a dependent property for the first property and/or for other calculated properties tracked by dependency manager 604.

In step 1406, whether the second property is included in the set of dependent properties for the first property is determined. For example, referring to FIG. 16, changed property locator 1604 may receive the indication of the changed second property, and may search each set of dependent properties 1606 maintained by dependency manager 604 to determine whether the second property is indicated therein. This includes determining whether the second property is included in set of dependent properties 610 show in FIG. 6. Changed property locator 1604 indicates each set of dependent properties 1606 that includes the second property.

For instance, with reference to the current example, a set of dependent properties 610 that includes the "C", "A", and "D" properties is maintained for the "Calc1" property. Property value monitoring logic 602 may generate dependency request 1506 to determine whether the "C" property (indicated as changed by change notification 1504) is a dependent property of the "Calc1" property. In response to receiving dependency request 1506, changed property locator 1604 may determine that the "C" property is included in set of dependent properties 610 maintained for the "Calc1" property.

In step 1408, an indication is generated that the first property is invalid if the second property is determined to be included in the set of dependent properties for the first property. With regard to FIG. 16, the calculated property corresponding to any set of dependent properties 1606 that is determined to include the second property is indicated as invalid. For example, referring to FIG. 6, if the second property is not included in set of dependent properties 610, the first property is not invalidated. If the second property is included in set of dependent properties 610, the second property is a dependent property for the first property, and the first property is invalidated.

As shown in FIG. 15, dependency manager 1506 may generate a dependency response 1508, which is received by property value monitoring logic 602, by property calculation logic 404, and/or by other entity. Dependency response 1508 indicates whether the second property is a dependent property for the first property, and therefore, whether the first property is invalid.

For instance, in the current example, dependency manager 1506 may generate dependency response 1508 to indicate that the "C" property is a dependent property for the "Calc1" property. Because dependency response 1508 indicates that the "C" property is a dependent property for the "Calc1" property, property value monitoring logic 602 determines that the current value of the "Calc1" property is invalid.

In step 1308, a calculated value for the first property is cleared from a cache memory. For example, subsequent to determining the first property to be invalid, property value monitoring logic 602 may generate a clear memory command 1510. Clear memory command 1510 is configured to clear the current value of the first property from memory (e.g., cache memory 606 of FIG. 6). Note that in an alternative embodiment, dependency manager 604 may generate clear memory command 1510.

For instance, in the current example, because the current value of the "Calc1" property is determined to be invalid, property value monitoring logic 602 may generate clear memory command 1510. As shown in FIG. 15, clear memory command 1510 is received by property calculation logic 404, which maintains the value of the "Calc1" property (e.g., in cache memory). Upon receiving clear memory command 1510, property calculation logic 404 clears the current value ("25") of the "Calc1" property from memory.

Furthermore, as shown in FIG. 15, a change notification 1512 may be generated by property calculation logic 404 to indicate that the value of the "Calc1" property has been changed/calculated. Change notification 1512 may be received by property value monitoring logic and/or a dependency manager that tracks the "Calc1" property as a dependent property for another calculated property, and/or by other entities.

The following subsection describes example embodiments for recalculating values for properties that have been determined to be invalid.

C. Example Embodiment for Recalculating Invalidated Property Values

This subsection describes example embodiments for recalculating values for invalid properties and for determining new sets of dependent properties. For instance, as described above, a value for a first property may be calculated and a set of dependent properties for the first property may be generated (e.g., according FIGS. 8-11). Furthermore, as described above, the value of one or more of the dependent properties may change, resulting in the invalidation of the calculated value of the first property (e.g., according to FIGS. 12-16). As such, a value for the first property may be recalculated. For instance, the value of the first property may be recalculated prior to, or in response to, the value of the first property being requested again.

Figure 17:
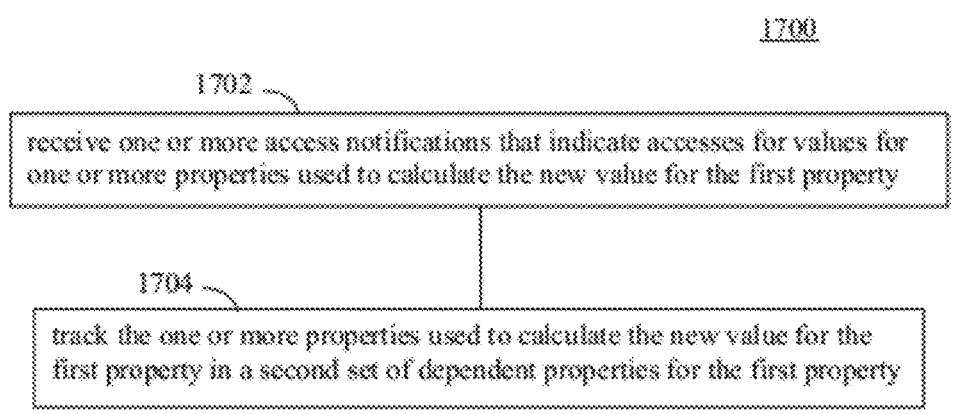
FIGS. 17 and 18 show flowcharts providing processes that may be performed to regenerate a set of dependent properties for a calculated property, according to example embodiments.
Figure 18:
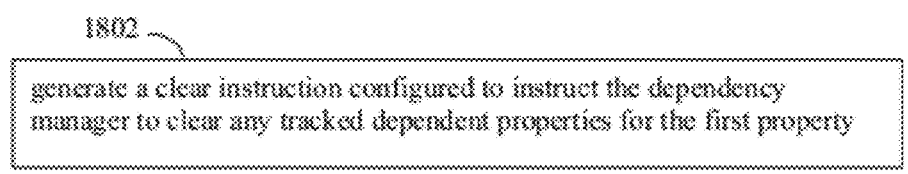

In an embodiment, to recalculate the value of the first property, the process described above with respect to flowchart 800 may be repeated by property calculation logic 404. Furthermore, property value monitoring logic 602 and dependency manager 604 may generate a new set of dependent properties for the recalculated first property. For example, FIGS. 17 and 18 show flowcharts providing processes that may be performed by property value monitoring logic 602 and dependency manager 604 to generate a new set of dependent properties for the recalculated first property, according to an example embodiment.

Figure 19:
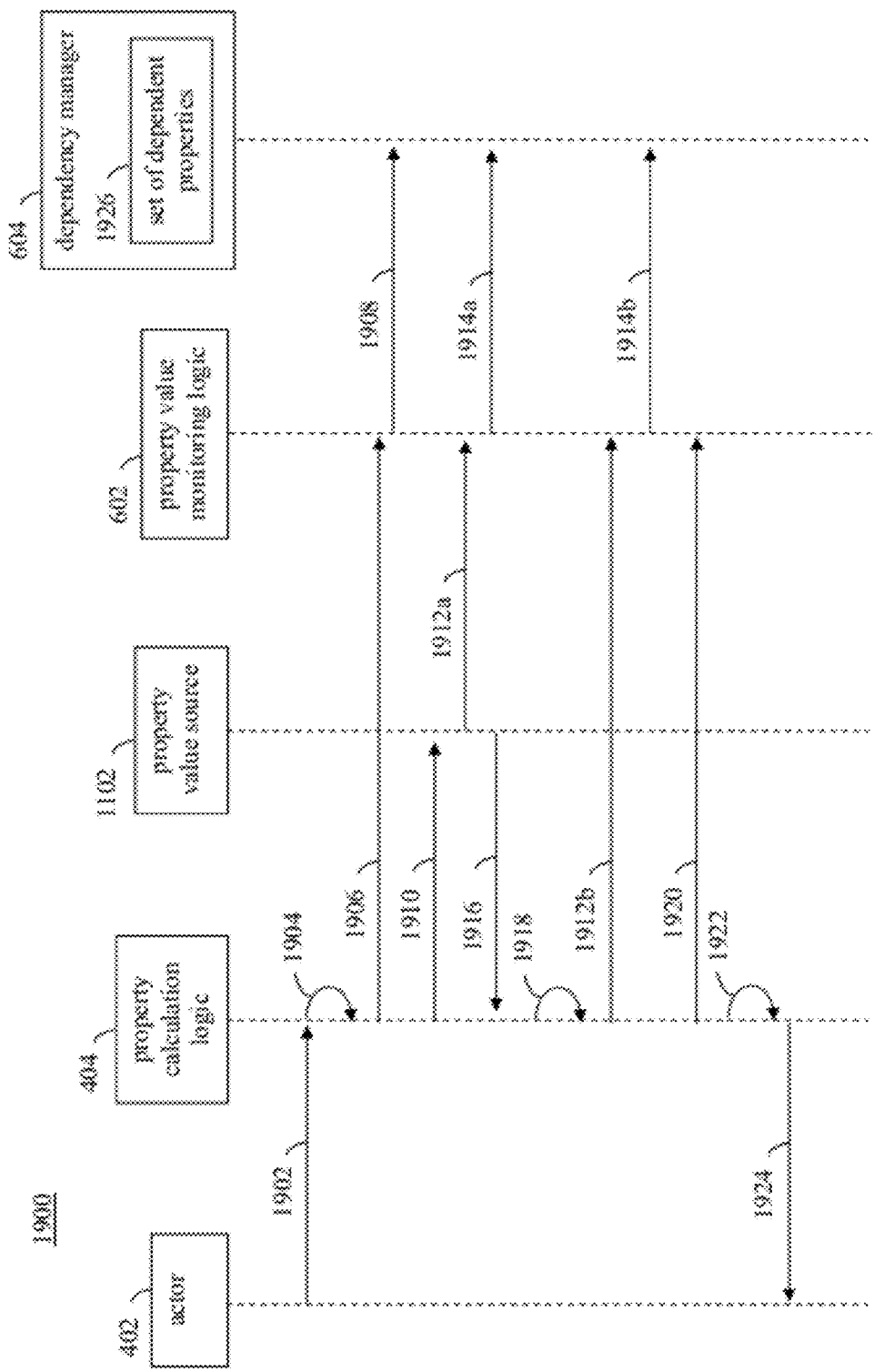
FIG. 19 shows a sequence diagram for interactions related to recalculating a value of an invalidated property and generating a new set of dependent properties, according to an example embodiment.

To illustrate the recalculation of the first property, and the generation of a new set of dependencies, flowchart 800, flowchart 1700, and step 1802 are described with reference to FIG. 19. FIG. 19 shows a sequence diagram 1900 for interactions between actor 402, property calculation logic 404, property value source 1102, property value monitoring logic 602, and dependency manager 604, according to an example embodiment. Further structural and operational embodiments will be apparent to persons skilled in the relevant art(s) based on the discussion regarding flowchart 800, flowchart 1700, and step 1802. Flowchart 800, flowchart 1700, step 1802, and sequence diagram 1900 are described as follows.

Referring to FIG. 8, flowchart 800 begins with step 802. In step 802, a request for a value of the first property is received. For example, as shown in FIG. 19, property calculation logic 404 receives a property value request 1902 from actor 402, which includes a request for the value of the first property. Note that property value request 1902 may be received from actor 402, as shown in FIG. 19, or from other actor/source.

In step 804, the value of the first property is determined to not be cached. For instance, as shown in FIG. 19, property calculation logic 404 may access cache memory (e.g., cache memory 606 in FIG. 6) for a value for the first property, as indicated by cache access 1904. Following the example of the prior subsection, property value monitoring logic 602 used clear memory command 1510 to clear the invalid value of the first property from memory. As such, property calculation logic 404 determines that a value for the first property is not cached, and operation proceeds to step 806.

According to step 806, the first property may be recalculated by accessing the same properties as were previously used to calculate the first property and/or by accessing different properties. For instance, in this example of step 806, the value for the first property is calculated by accessing different properties than in the previous calculation of the first property. As shown in FIG. 19, property calculation logic 404 may generate a start calculation notification 1906, which is received by property value monitoring logic 602. Start calculation notification 1906 indicates to property value monitoring logic 602 that a value for the "Calc1" property is being calculated. Accordingly, property value monitoring logic 602 may generate a clear dependencies notification 1908 to dependency manager 604. For example, referring to FIG. 18, in step 1802, a clear instruction is generated that is configured to instruct the dependency manager to clear any tracked dependent properties for the first property. In response to clear dependencies notification 1908, dependency manager 604 may clear set of dependent properties 610 for the "Calc1" property, so that no dependent properties are indicated. For instance, following the current example of the prior subsection, set of dependent properties 610, which included the "C", "A", and "D" properties as dependent properties for the "Calc1" property, is cleared by dependency manager 604.

To recalculate a value of the "Calc1" property, property calculation logic 404 evaluates whether MyClass2.0>=100. To perform the evaluation, property calculation logic 404 accesses a value for the "C" property by generating a first property value access request 1910, which is received by property value source 1102. Property value source 1102 maintains values for one or more properties, including the "C" and "D" properties of the Class 2 resource in the current example.

In the current example, according to step 808, access notifications are generated that indicate properties accessed to calculate a value for the first property. For instance, as shown in FIG. 19, upon receiving property value access request 1910, property value source 1102 may generates an access notification 1912a, which is received by property value monitoring logic 602. Access notification 1912a indicates that a value for the "C" property was accessed at property value source 1102. As shown in FIG. 19, property value source 1102 also generates a returned property value 1916, which is received by property calculation logic 404. Returned property value 1916 includes a value for the "C" property, which may be used by property calculation logic 404 to evaluate whether MyClass2.0>=100 (in step 806). As described above, in the current example, the value for the "C" property is "100" (as changed by property value change 1502 in FIG. 15).

Referring to FIG. 17, flowchart 1700 begins with step 1702. In step 1702, one or more access notifications are received that indicate accesses for values for one or more properties used to calculate the new value for the first property. For example, as described above, property value monitoring logic 602 (e.g., property value access monitor 702 of FIG. 7) receives access notification 1912a. Access notification 1912a indicates that a value for the "C" property was accessed to calculate a value for the "Calc1" property.

In step 1706, the one or more properties used to calculate the new value for the first property are tracked in a second set of dependent properties for the first property. Referring to FIG. 19, subsequent to receiving access notification 1912a, property value monitoring logic 602 may generate a track dependency instruction 1914a, which is received by dependency manager 604. Track dependency instruction 1914a is configured to instruct dependency manager 604 to track the "C" property as a dependent property for the "Calc1" property (e.g., similar to step 1002 of FIG. 10). As such, dependency manager 604 may store an indication of the "C" property in a new set of dependent properties 1926 for the "Calc1" property.

Note that step 808 of flowchart 800 and steps 1702 and 1704 of flowchart 1700 may be performed with regard to any number of properties accessed during step 806 of flowchart 800 to calculate a new value for the first property For instance, in the current example, property calculation logic 404 may evaluate MyClass2.0>=100, for a value of MyClass2.0=100 (where the "C" property has a changed value of "100"). In such case, because 100 is equal to 100, "return B+MyClass2.C" is calculated by property calculation logic 404 to determine a value for the "Calc1" property. To perform this calculation, property calculation logic 404 accesses values for the "B" property.

In the current example, with regard to the "B" property, property calculation logic 404 includes the Class 1 resource, which maintains a value for the "B" property. As such, according to step 806 (FIG. 8), property calculation logic 404 may access the "B" property internally, as indicated by a property value access request 1918. Subsequently, according to step 808, property calculation logic 404 may generate an access notification 1912b, which indicates that a value for the "B" property was accessed (having the value of "10" in the current example). According to step 1702 (FIG. 17), property value monitoring logic 602 receives access notification 1912b. According to step 1704, dependency manager 604 may track the "B" property as a dependent property for the "Calc1" property. For instance, according to step 1002 (FIG. 10), property value monitoring logic 602 may generate a track dependency instruction 1914b, which is received by dependency manager 604. Track dependency instruction 1914b is configured to instruct dependency manager 604 to track the "B" property as a dependent property for the "Calc1" property.

At this point, property calculation logic 404 has received values for the "C" and "B" properties, and can therefore complete calculation of the "Calc1" property (according to step 806 of FIG. 8). Property calculation logic 404 calculates "return B+MyClass2.C", with values of "10" and "100" for the "B" and "MyClass2.C" parameters, respectively, to generate a value of "110" for the "Calc1" property. As shown in FIG. 19, property calculation logic 404 may generate a calculation complete notification 1920, to indicate that the recalculation of a value for the "Calc1" property is complete. Calculation complete notification 1920 is received by property value monitoring logic 602. Calculation complete notification 1920 indicates to property value monitoring logic 602 that no further access notifications for the current calculation of the value for the "Calc1" property will be received, and thus set of dependent properties 1926 maintained by dependency manager 604 is complete. In the current example, set of dependent properties 1926 indicates the "C" and "B" properties as dependent properties for the "Calc1" property.

Thus, in some cases, the set of dependent properties generated for a calculated property may change at different times that the calculated property is calculated. For instance, in the current example, set of dependent properties 1926 (which includes the "C" and "B" properties) generated when the value for the "Calc1" property was recalculated is different from set of dependent properties 610 (which includes the "A", "C", and "D" properties) generated when the value for the "Calc1" property was previously calculated. In this manner, property value monitoring logic 602 may track different sets of dependent properties for a same calculated property, depending on which properties were most recently used to calculate the calculated property.

Referring back to flowchart 800 of FIG. 8, in step 810, the calculated value of the first property is stored in a cache memory. As just described, property calculation logic 404 calculates a value for the first property (which in the current example is "110") that may be stored in a cache memory according to a cache store request 1922. Furthermore, the calculated value may optionally be received by actor 402 (and/or other entity) as returned value 1924.

III. Further Example Embodiments

Property calculation logic 404, property dependency tracking system 406, property value monitoring logic 602, dependency manager 604, property value access monitor 702, property value change monitor 704, property value source 1102, dependent property set generator 1602, and changed property locator 1604 may be implemented in hardware, software, firmware, or any combination thereof. For example, property calculation logic 404, property dependency tracking system 406, property value monitoring logic 602, dependency manager 604, property value access monitor 702, property value change monitor 704, property value source 1102, dependent property set generator 1602, and/or changed property locator 1604 may be implemented as computer program code configured to be executed in one or more processors. Alternatively, property calculation logic 404, property dependency tracking system 406, property value monitoring logic 602, dependency manager 604, property value access monitor 702, property value change monitor 704, property value source 1102, dependent property set generator 1602, and/or changed property locator 1604 may be implemented as hardware logic/electrical circuitry.

Figure 20:
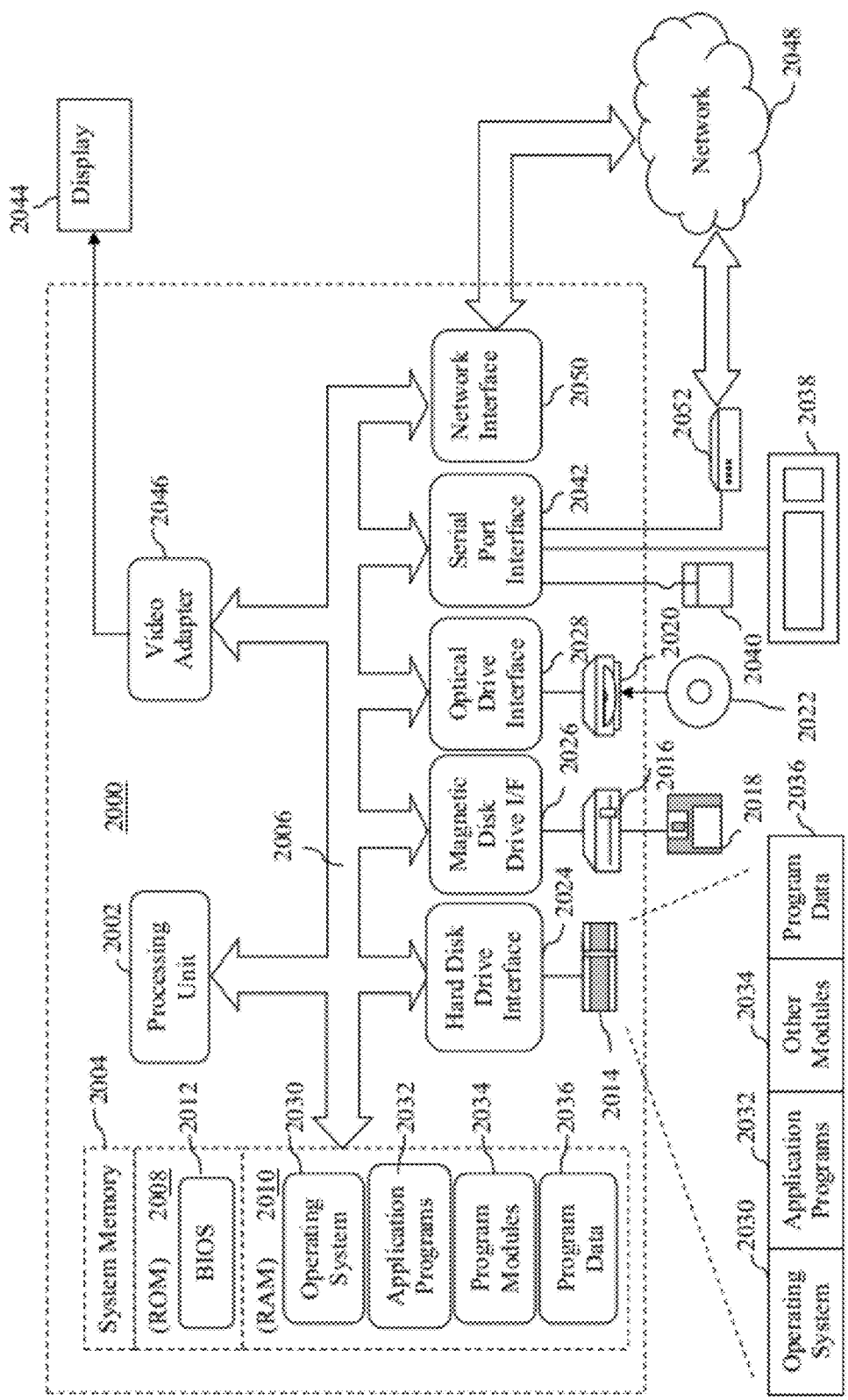
FIG. 20 shows a block diagram of an example computer system that may be used to implement embodiments of the present invention.

FIG. 20 depicts an exemplary implementation of a computer 2000 in which embodiments of the present invention may be implemented. For instance, dependent property determining and tracking system 400 of FIG. 4, dependent property determining and tracking system 600 of FIG. 6, and/or further embodiments may be implemented in one or more computers similar to computer 2000. Computer 2000 may be a general-purpose computing device in the form of a conventional personal computer, a mobile computer, or a workstation, for example, or computer 2000 may be a special purpose computing device. The description of computer 2000 provided herein is provided for purposes of illustration, and is not intended to be limiting. Embodiments of the present invention may be implemented in further types of computer systems, as would be known to persons skilled in the relevant art(s).

As shown in FIG. 20, computer 2000 includes a processing unit 2002, a system memory 2004, and a bus 2006 that couples various system components including system memory 2004 to processing unit 2002. Bus 2006 represents one or more of any of several types of bus structures, including a memory bus or memory controller, a peripheral bus, an accelerated graphics port, and a processor or local bus using any of a variety of bus architectures. System memory 2004 includes read only memory (ROM) 2008 and random access memory (RAM) 2010. A basic input/output system 2012 (BIOS) is stored in ROM 2008.

Computer 2000 also has one or more of the following drives: a hard disk drive 2014 for reading from and writing to a hard disk, a magnetic disk drive 2016 for reading from or writing to a removable magnetic disk 2018, and an optical disk drive 2020 for reading from or writing to a removable optical disk 2022 such as a CD ROM, DVD ROM, or other optical media. Hard disk drive 2014, magnetic disk drive 2016, and optical disk drive 2020 are connected to bus 2006 by a hard disk drive interface 2024, a magnetic disk drive interface 2026, and an optical drive interface 2028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2030, one or more application programs 2032, other program modules 2034, and program data 2036. Application programs 2032 or program modules 2034 may include, for example, computer program logic for implementing property calculation logic 404, property dependency tracking system 406, property value monitoring logic 602, dependency manager 604, property value access monitor 702, property value change monitor 704, property value source 1102, dependent property set generator 1602, changed property locator 1604, flowchart 500, flowchart 800, flowchart 900, step 1002, flowchart 1200, flowchart 1300, flowchart 1400, flowchart 1700, and/or step 1802 (including any step of flowcharts 500, 800, 900, 1200, 1300, 1400, and/or 1700), and/or any further embodiments as described above.

A user may enter commands and information into the computer 2000 through input devices such as keyboard 2038 and pointing device 2040. Other input devices (not shown) may include a microphone, joystick, game pad, satellite dish, scanner, or the like. These and other input devices are often connected to the processing unit 2002 through a serial port interface 2042 that is coupled to bus 2006, but may be connected by other interfaces, such as a parallel port, game port, or a universal serial bus (USB).

A monitor 2044 or other type of display device is also connected to bus 2006 via an interface, such as a video adapter 2046. In addition to the monitor, computer 2000 may include other peripheral output devices (not shown) such as speakers and printers.

Computer 2000 is connected to a network 2048 (e.g., the Internet) through a network adaptor or interface 2050, a modem 2052, or other means for establishing communications over the network. Modem 2052, which may be internal or external, is connected to bus 2006 via serial port interface 2042.

As used herein, the terms "computer program medium" and "computer-readable medium" are used to generally refer to media such as the hard disk associated with hard disk drive 2014, removable magnetic disk 2018, removable optical disk 2022, as well as other media such as flash memory cards, digital video disks, random access memories (RAMs), read only memories (ROM), and the like.

As noted above, computer programs and modules (including application programs 2032 and other program modules 2034) may be stored on the hard disk, magnetic disk, optical disk, ROM, or RAM. Such computer programs may also be received via network interface 2050 or serial port interface 2042. Such computer programs, when executed or loaded by an application, enable computer 2000 to implement features of embodiments of the present invention discussed herein. Accordingly, such computer programs represent controllers of the computer 2000.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   receiving a request for a value of a first property, the first property being associated with a property definition that includes a formula for calculating the value of the first property;
   determining that the value of the first property is not cached;
   calculating, by at least one processor, the value for the first property in accordance to the formula included in the property definition for the first property, said calculating including accessing values for one or more properties used to calculate the value for the first property;
   detecting said accessing values for the one or more properties; and
   tracking the one or more properties in a set of dependent properties for the first property as a result of said detecting.

2. The method of claim 1, further comprising:
   storing the calculated value of the first property in a cache memory.

3. The method of claim 2, further comprising:
   detecting a change in the value of a second property;
   generating a change notification based on the detecting of the change in the value of the second property;
   determining that the second property is included in the set of dependent properties for the first property; and
   indicating that the value of the first property is invalid.

4. The method of claim 3, further comprising:
   clearing the calculated value for the first property from the cache memory.

5. The method of claim 4, further comprising:
   receiving a second request for a value for the first property;
   determining that the value of the first property is invalid;
   clearing the first set of dependent properties for the first property; and
   calculating a new value for the first property.

6. The method of claim 5, wherein said calculating a new value for the first property comprises:
   accessing values for one or more properties used to calculate the new value for the first property;

detecting said accessing of the values for the one or more properties used to calculate the new value for the first property; and tracking the one or more properties used to calculate the new value for the first property in a second set of dependent properties for the first property.

7. The method of claim 6, wherein said accessing values for one or more properties used to calculate the new value for the first property does not include accessing the value of the second property.

8. A method, comprising:

receiving a start calculation notification that indicates that a value for a first property is to be calculated, the first property being associated with a property definition that includes a formula for calculating the value for the first property;

receiving one or more access notifications that indicate accesses for values for one or more properties used to calculate the value for the first property;

tracking, by at least one processor, the one or more properties in a set of dependent properties for the first property; and receiving a calculation complete notification that indicates that a calculation of the value for the first property is complete, the calculation being based on the formula included in the property definition of the first property.

9. The method of claim 8, wherein said tracking comprises:

generating one or more tracking instructions configured to instruct a dependency manager to track the one or more properties in the set of dependent properties for the first property.

10. The method of claim 9, further comprising:

receiving a change notification generated based on a detection of a change in the value of a second property; and determining whether the first property is invalid due to the change in the value of the second property.

11. The method of claim 10, wherein said determining whether the first property is invalid due to the change in the value of the second property comprises:

generating a request to the dependency manager for an indication of whether the first property is invalid, the dependency manager being configured to determine whether the first property is invalid by determining whether the second property is included in the set of dependent properties for the first property; and receiving an indication from the dependency manager that the first property is invalid in response to the request because the second property is determined to be included in the set of dependent properties for the first property.

12. The method of claim 11, further comprising:

clearing a calculated value for the first property from a cache memory.

13. The method of claim 11, further comprising:

receiving a second start calculation notification that indicates that a new value for the first property is to be calculated;

clearing the first set of dependent properties for the first property;

receiving one or more access notifications that indicate accesses for values for one or more properties used to calculate the new value for the first property;

tracking the one or more properties used to calculate the new value for the first property in a second set of dependent properties for the first property; and receiving a second calculation complete notification that indicates that a calculation of the new value for the first property is complete.

14. The method of claim 13, wherein said clearing the first set of dependent properties for the first property comprises:

generating a clear instruction configured to instruct the dependency manager to clear the first set of dependent properties.

15. A method, comprising:

tracking one or more properties in a set of dependent properties for a first property, the one or more properties having been indicated as used to calculate a value for the first property, the first property being associated with a property definition that includes a formula to calculate the value for the first property;

receiving an indication that a change in a value of a second property is detected;

determining whether the second property is included in the set of dependent properties for the first property; and generating, by at least one processor, an indication that the first property is invalid if the second property is determined to be included in the set of dependent properties for the first property.

16. The method of claim 15, wherein said determining comprises:

determining whether the second property is included in one or more of a plurality of sets of dependent properties, each of the plurality of sets of dependent properties including at least one property that was used to calculate a value for a corresponding calculated property; and wherein said generating comprises:

generating an indication that the corresponding calculated property is invalid for each of the plurality of sets of dependent properties that is determined to include the second property.

17. The method of claim 15, further comprising:

clearing a calculated value for the first property from a cache memory.

18. The method of claim 15, further comprising:

receiving a clear instruction to clear the first set of dependent properties for the first property; and tracking one or more properties in a second set of dependent properties for the first property, the one or more properties in the second set of dependent properties being indicated as used to calculate a new value of the first property.

19. The method of claim 18, wherein the second set of dependent properties does not include the second property.

20. The method of claim 18, further comprising:

receiving a second change notification generated based on the detection of a change in a value of a third property;

determining whether the third property is included in the second set of dependent properties for the first property; and generating an indication that the first property is invalid if the third property is determined to be included in the second set of dependent properties for the first property.

* * * * *